H. B. COBB.
Sleeping-Cars.

No. 157,377.

4 Sheets--Sheet 3.

Patented Dec. 1, 1874.

Witnesses

Inventor
H. B. Cobb
by his Attys

4 Sheets--Sheet 4.
H. B. COBB.
Sleeping-Cars.
No. 157,377. Patented Dec. 1, 1874.
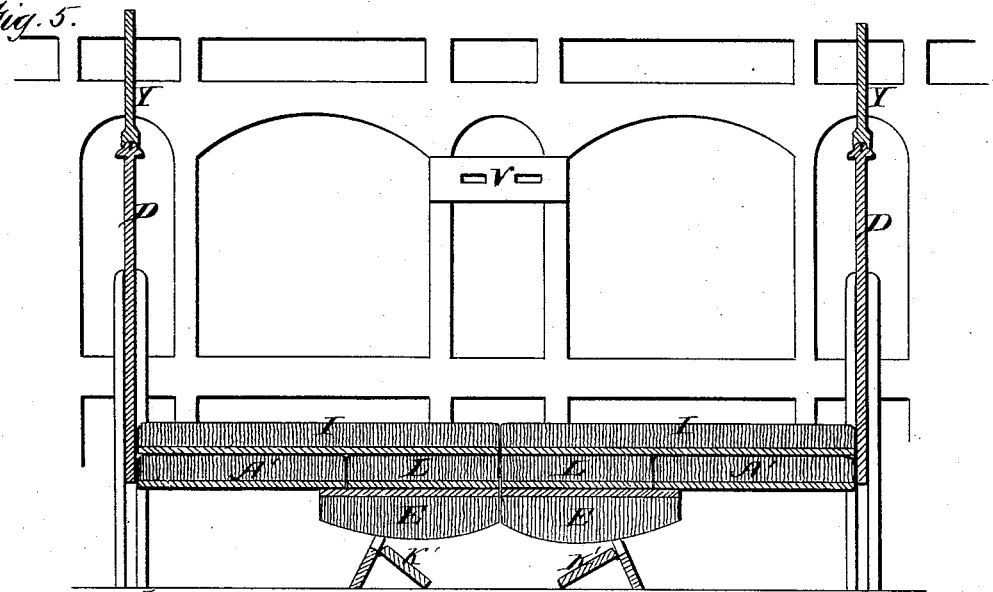
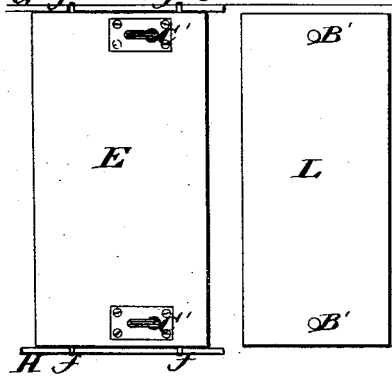
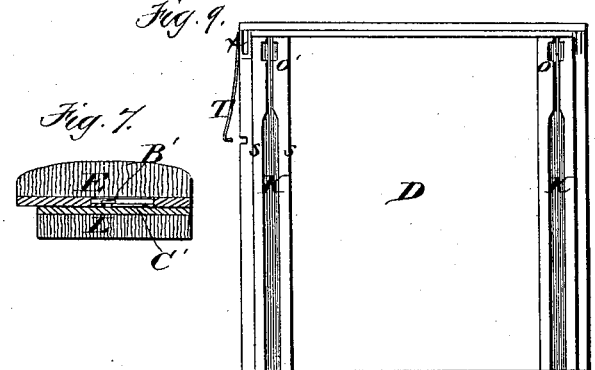
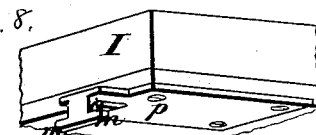
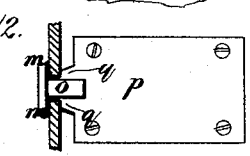
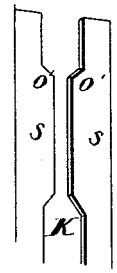
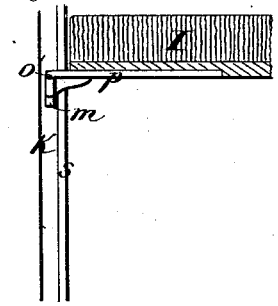
Witnesses. Inventor
H. B. Cobb.
by his Attys.
THE GRAPHIC CO. PHOTO-LITH.39 & 41 PARK PLACE, N.Y.

UNITED STATES PATENT OFFICE.

HENRY B. COBB, OF WILMINGTON, DELAWARE.

IMPROVEMENT IN SLEEPING-CARS.

Specification forming part of Letters Patent No. 157,377, dated December 1, 1874; application filed September 19, 1874.

*To all whom it may concern:*

Be it known that I, HENRY B. COBB, of Wilmington, in the county of New Castle and State of Delaware, have invented certain new and useful Improvements in Sleeping-Cars; and I do hereby declare the following to be a full and exact description of the same, reference being had to the accompanying drawings, forming part of this specification, in which—

Figure 1:
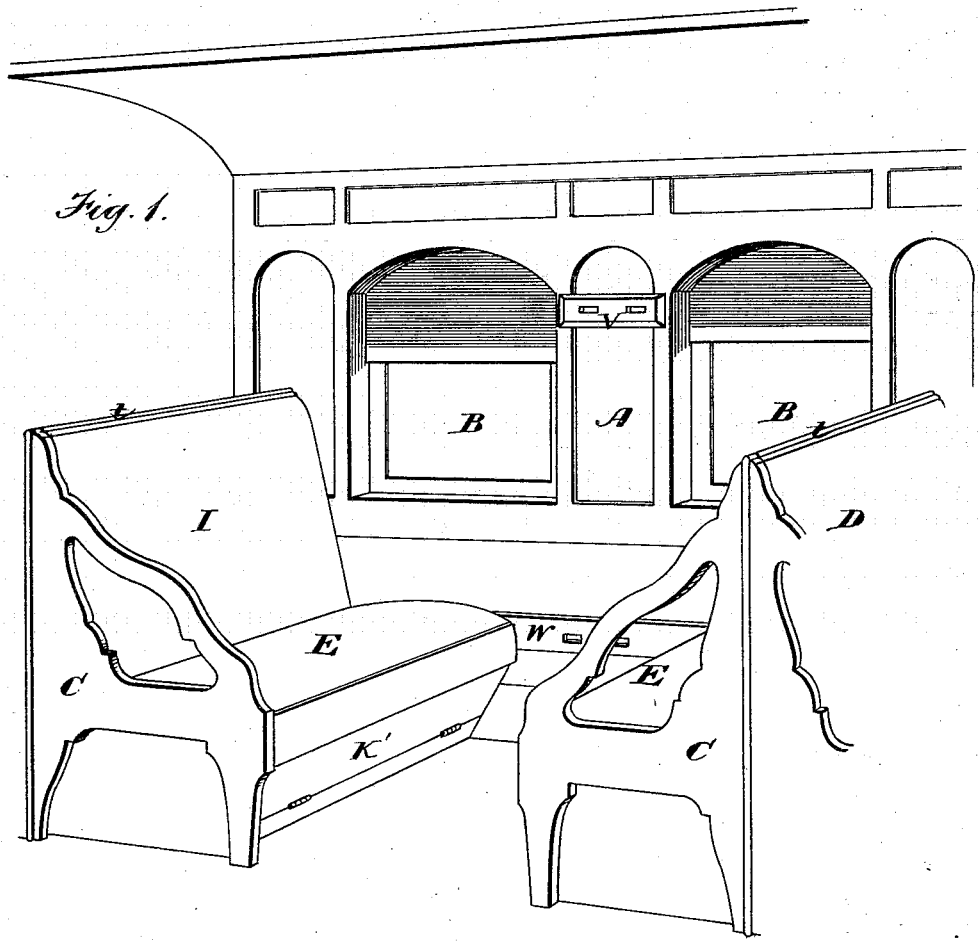
Figure 2:
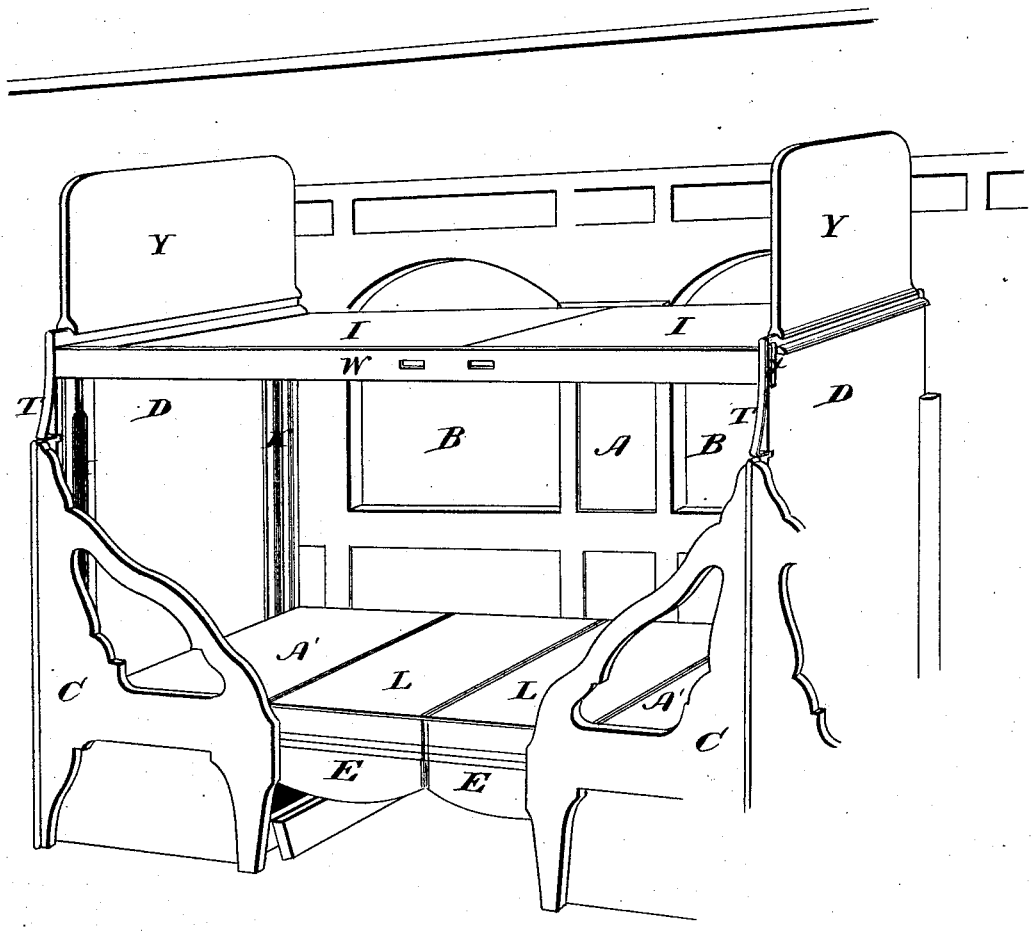
Figure 3:
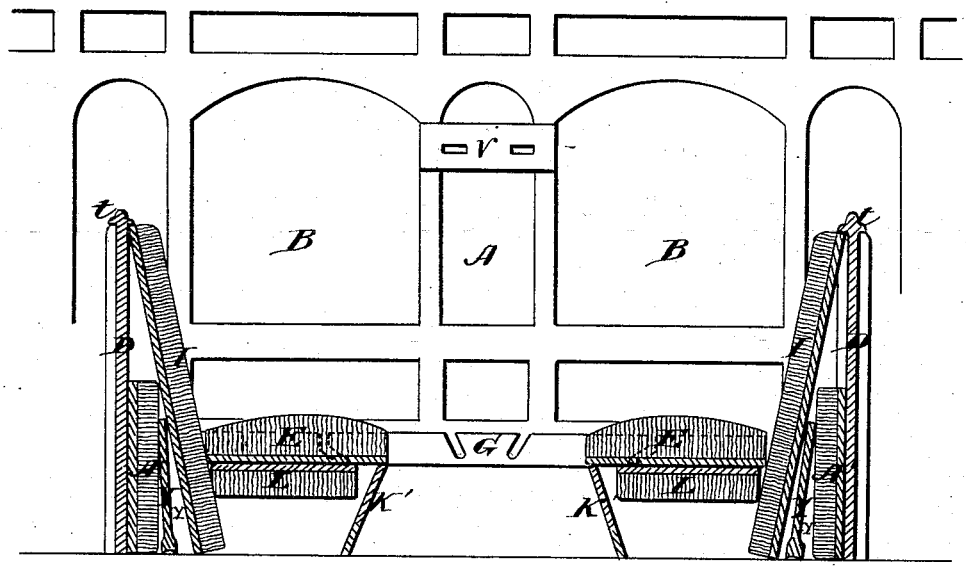
Figure 4:
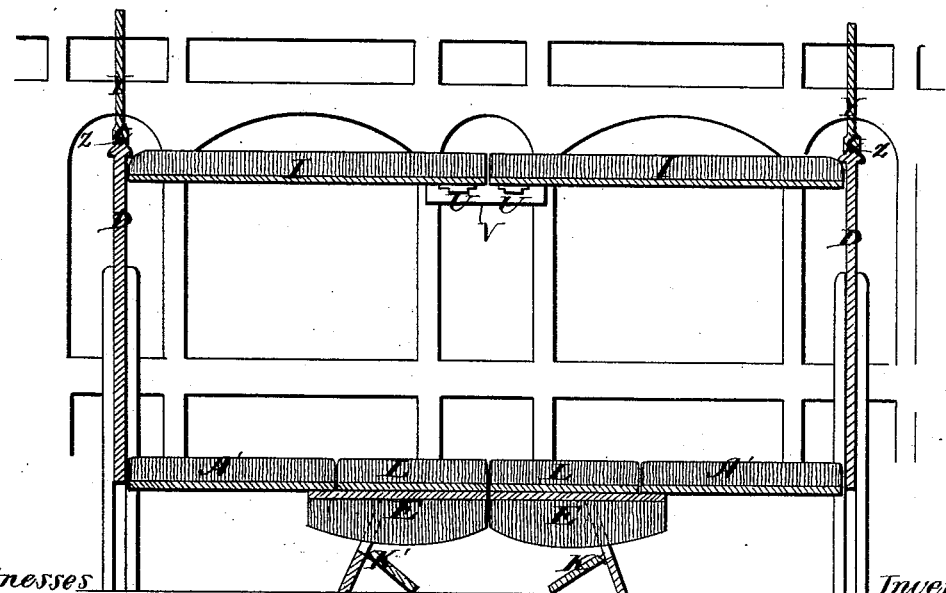

Figure 1, Sheet 1, is a perspective view of a sleeping-car section constructed in accordance with my invention, and having the upholstering folded down to form seats. Fig. 2, Sheet 2, is a similar view, showing the upper and lower beds made up. Fig. 3, Sheet 3, is a longitudinal vertical section of the compartment with the beds folded down into seats. Fig. 4, Sheet 3, is a similar section, showing the compartment with the upper and lower beds made up. Fig. 5, Sheet 4, is a longitudinal section, showing only the lower bed made up. Fig. 6, Sheet 4, is a view showing one of the seats and its bed-section disconnected. Fig. 7, Sheet 4, is a sectional view, showing the same connected. Fig. 8, Sheet 4, is a perspective view, showing one of the lugs on the ends of the sections which form the upper bed. Fig. 9, Sheet 4, is a side elevation of bulk-head, showing the grooves or sockets for receiving and holding the lugs of the upper bed. Fig. 10, Sheet 4, is a sectional view, showing the lugs fitted within the sockets and grooves; and Fig. 11, Sheet 4, is an elevation of the side rail, to which the pivots or bearings of the seats are hung.

Similar letters of reference in the accompanying drawings denote the same parts.

The object of this invention is to improve the construction of railroad sleeping-cars, so as to render them lighter, less top-heavy, and less expensive to build, and so as to increase the comfort of the couches and seats, adapt them for quicker and more convenient adjustment, increase the ventilation of the cars and their berths, remove all obstructions to the opening of the windows, dispense with the cumbersome mattresses now in use, facilitate the cleaning and airing of the cars, the seats, and the bedding, and improve the general interior appearance of the cars. To these ends the invention consists, as a whole, in the improved apparatus for seats and couches, the mode of adjusting and operating the same, and the adaptation of the ordinary railway-car thereto; and in detail it consists, first, in the mode of supporting the upper berths by means of sliding adjustable bulk-heads or their equivalents; secondly, in providing the upper berth with a spring-mattress, and adapting the same to be used as the back of the car-seat when the bed is not made up; thirdly, in the mode of forming and supporting the spring-mattresses for the upper berths; fourthly, in adapting the sliding seat-back to be employed as an extensible chair-back, back-rest, and head-rest, when the beds are not made up; fifthly, in forming the car-seats with spring-mattresses on their under sides, and adapting them to be used for making up the beds by turning them over; sixthly, in adapting the upper berth and its mattress to be united with the lower mattresses in making up the bed for an open section; seventhly, in the mode of stowing away the various parts of the beds and berths when not made up, in order to remove all unnecessary weight from the top or roof of the car; eighthly, in the mode of combining the seat and mattress.

In the accompanying drawings, A represents the side, B B the windows, and C C the seat-frames composing a section of a railroad sleeping-car. D D are bulk-heads separating the backs of two adjoining seats, and adapted to slide vertically within grooves formed in the seat-frames. E E are the seats of the car-section, upholstered with springs, and provided with pins or pivots *f f* in each end, which, to support the seats in position, are fitted within notches formed in a long rail, G, on the side of the car, and two short rails, H, on the inner faces of the seat-frames. The backs I I of the seats are formed of long boards or other suitable structure, also upholstered with springs upon their front sides, and arranged in an inclined position, extending from the top of the bulk-heads to the floor of the car, or nearly so, behind the seats. The upper edges of the backs, near the corners, are provided with lugs composed of the trunnions $m\ m$, formed upon a block, $o$, which, in its turn, is attached to a plate, $p$, in such a manner that the latter shall project somewhat beyond the sides of the block to form bearing-surfaces $g\ g$. The trunnions fit within vertical rabbeted grooves K K, formed by the plates $s\ s$, or other proper means, in the faces of the bulk-heads near the edges, for a purpose to be presently described.

The seats and their backs thus arranged for day travel are shown in Fig. 1. It will be observed that the long back affords ample support for the body of the traveler.

The top edge of the bulk-heads are provided with an ornamental rail, $t$, which forms a neat finish corresponding to the beading or finish on the faces of the seat-frames. The spaces under the front edges of the seats are closed by hinged boards K', as shown in Fig. 1, by which access is had to the compartments beneath the seats, and which also afford additional support for the seats and mattresses. To convert the section into two sleeping-berths the hinged boards K' K' are first swung down and the seats turned over toward each other, swinging on the front pivots $f\ f$ for this purpose, so that the spring-mattresses L L on the under side shall be uppermost, and join each other at the center of the section. The bulk-heads are then pulled up until their upper ends are at the requisite height to form end supports for the upper berths, in which position they are held by the springs T T, secured to their front edges, so as to rest upon the top of the seat-frames when the bulk-heads are raised, and to fit within the grooves of the seat-frames when the bulk-heads are lowered. After the bulk-heads have been raised the inclined backs are slid up until the trunnions $m\ m$ pass into the upper part of the grooves, and then swung out toward each other, turning on the trunnions $m\ m$ for the purpose, until their lower ends unite at the center of the section. Here they are supported by spring-catches U U, which engage respectively with a recessed block, V, secured to the side of the car between the windows, and a recessed rail, W, supported by the bulk-heads at the front edge of the berth. The rail W may be of wood or metal, and is fitted within dovetailed catches X, attached to the bulk-heads. When not in use it is stowed out of the way against the side of the car at the ends of the seats, as shown in Fig. 1. To fill or nearly fill the spaces between the upper edges of the raised bulk-heads and the top of the car, head-boards Y Y are slid along the beading of the bulk-heads and supported by pins $z\ z$ or other convenient means from the side of the car, and to complete the lower berth upholstered boards or spring-mattresses A' A' are placed upon the rails G H in rear of the mattresses L L.

The car-section having the upper and lower berths made up as above-described is shown clearly in Fig. 2.

The rabbeted slots or grooves in the bulk-head are contracted near the top to form shoulders $o'\ o'$, upon which the bearing-surface of the plates $p$ rest securely when the inclined backs are swung up to form the upper berths.

The object in extending the rabbeted grooves to the lower end of the bulk-heads is threefold—viz., first, to permit the ready application and removal of the sliding backs; secondly, to permit the back on one side of a bulk-head to remain in position as a back-rest, while the back in the opposite section is turned up in forming a berth, by which provision one section can be converted into a sleeping couch or couches, while the occupants are still seated in the adjoining sections; thirdly, to admit of the backs being dropped down into a horizontal position upon the lower mattresses to form an open section, as shown in Fig. 5.

If desired, the bulk-heads may be arranged for vertical extension to a greater or less degree, and the other devices, besides the springs, may be provided for their support; but I prefer to use the springs as the most economical means.

When the car-section is arranged for occupancy with seats the lower bed-sections A' and the head-boards Y are placed within the spaces behind the inclined backs, as shown in Fig. 3, the bedding being stowed within the compartments under the seats.

The seats E and mattresses L are connected to each other by the headed pins B' upon the backs of the former fitting within the locking-slots C' in the backs of the latter, as shown in Figs. 6 and 7. This construction adapts the mattress and seat to be disconnected at any time for repairs and other purposes.

By my invention I am enabled to dispense with the cumbersome mattresses now employed in sleeping-cars, and to use spring-mattresses for both the upper and lower berths, which mattresses, although made in sections, fit so accurately together that each berth has a uniform elastic surface throughout.

The ventilation and airing of the car and beds are facilitated by the use of the spring-mattresses and the arrangement of the berths and seats, while the space between the upper and lower berths when made up is increased to such an extent as to afford more ready access to the car-windows, and enable the occupant of the lower berth to assume a sitting position without contact with the upper berth.

It will be observed that the entire weight of the apparatus, whether arranged for seats or couches, is supported from the floor and side of the car, leaving the top entirely free and unencumbered.

By this arrangement the car may be made fifty per cent. lighter than the ordinary sleeping-car, the roof of which sustains the entire weight of the upper berths at all times, together with bedding, &c., consequently requiring a stronger, heavier, and more expensive car-body.

In addition to this advantage in the structure of the car, the weight is disposed nearer the trucks, which may be decreased from six to four wheels each.

In these respects alone my invention is of great practical value, and places a sleeping-car, in cost of construction and use, nearly upon a level with the ordinary passenger-coach.

Other advantages, of course, grow out of the invention, which those skilled in the art to which it appertains will readily appreciate.

Having thus described my invention, what I claim as new is—

1. The upper berths of a sleeping-car supported by sliding adjustable bulk-heads D D, which extend the entire length of the seat-frames, substantially as described.

2. The seat-backs upholstered with springs, and forming a continuous spring-mattress for the upper berths, when two of such backs are swung into a horizontal position, substantially as described.

3. The upper berths supported by the sliding bulk-heads D D, and suitable catches engaging with the side of the car and a front berth-rail, W, substantially as described.

4. The sliding seat-back Y, adapted to form an extensible chair-back, back-rest, or head-rest the entire length of the seat-frame, substantially as described.

5. The upper berths and mattresses, adapted by intervening mechanism to be let down upon the lower mattresses in making up the bed for an open section, substantially as described.

6. The car-seat E and mattress L, combined by suitable devices in such a manner as to be capable of separation, substantially as described.

7. The lower berth of a sleeping-car, formed by combining the spring-mattress sections A' A' with the mattress-sections L L on the reverse side of the seats E E, substantially as described.

8. The combination of the bulk-heads D and seat-backs I, to form spaces for the reception of the head-boards and mattress-section A', substantially as described.

9. The combination of the berth-rail W and recessed block on the side of the car with the bulk-heads and upper berth-sections, substantially as described.

10. The upper berth-sections or seat-backs Y, adapted to slide vertically between two bulk-heads, D D, substantially as and for the purposes specified.

11. The supporting and guiding lugs of the seat-backs, constructed with the trunnions $m$ $m$ and bearing-surfaces $g$ $g$, substantially as and for the purpose specified.

12. The recessed rails G H, combined with the pins $f$ $f$, to support the reversible seats and mattresses, substantially as described.

HENRY B. COBB.

Witnesses:
  Dr. D. A. DODGE,
  JOSHUA CONNER.